2,979,595

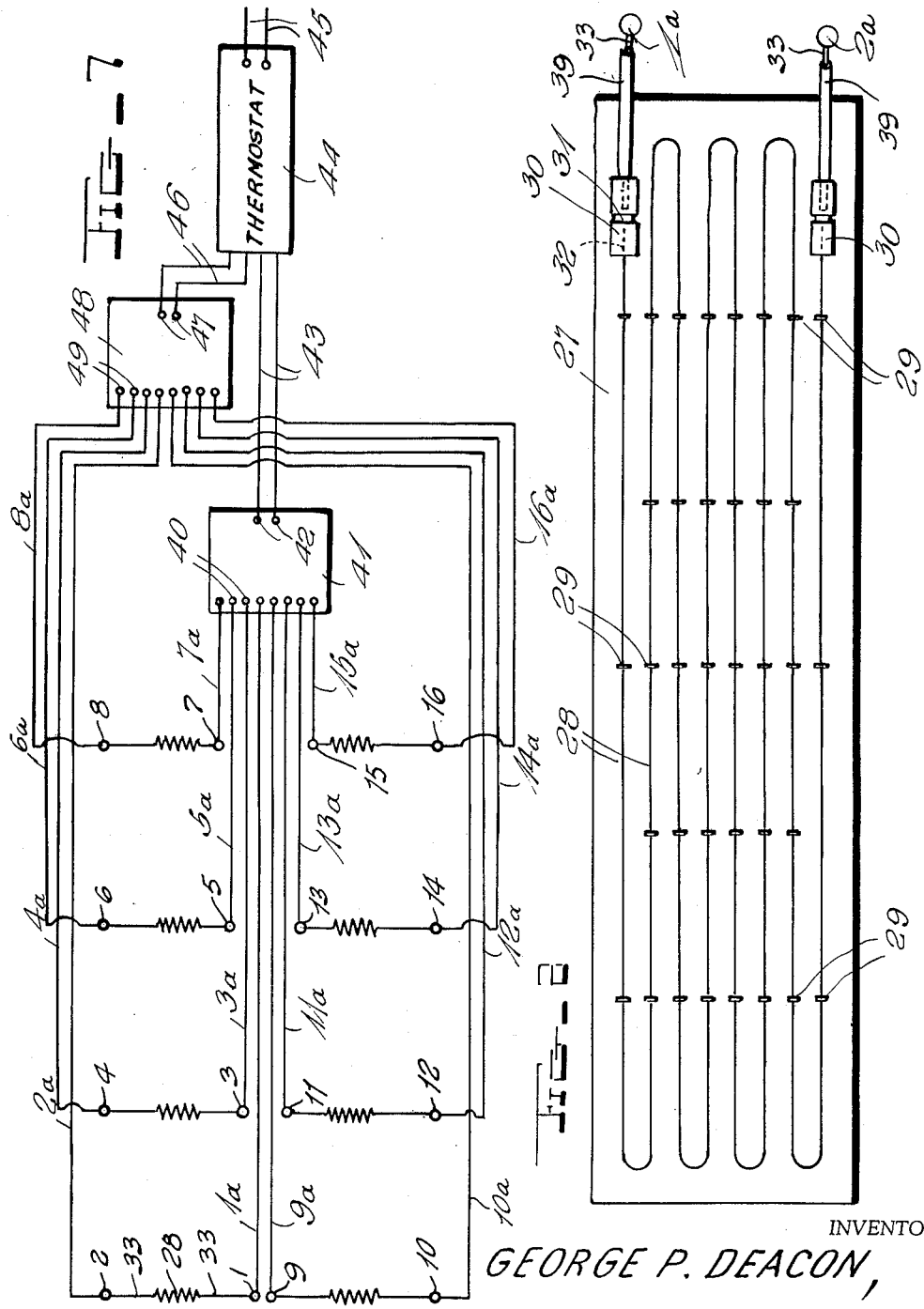

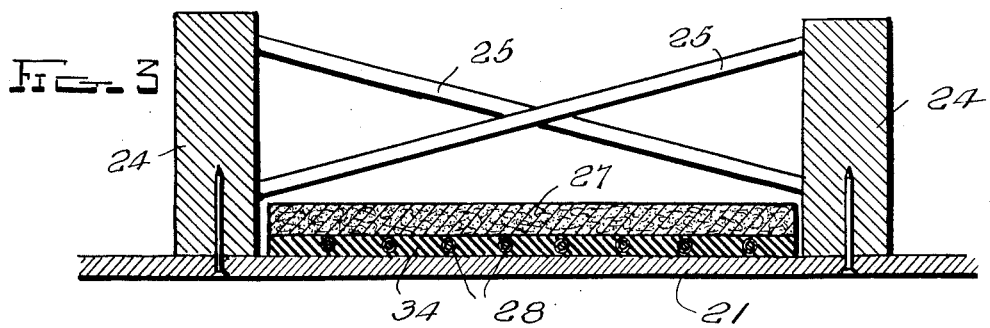
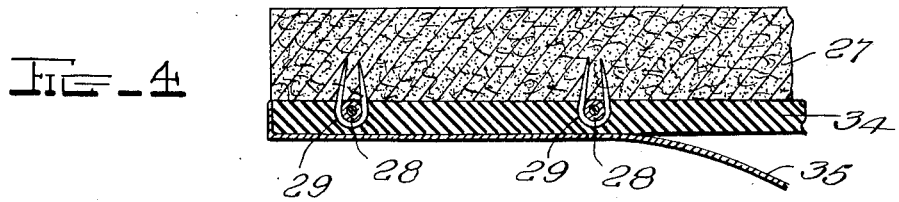
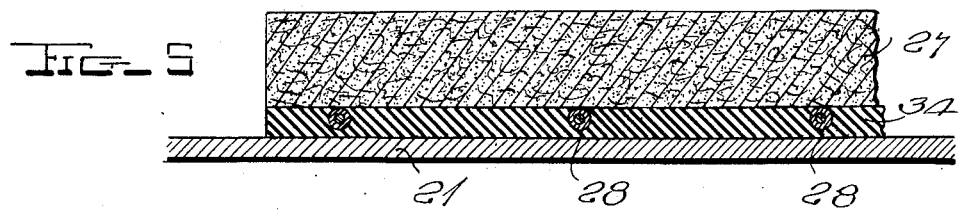
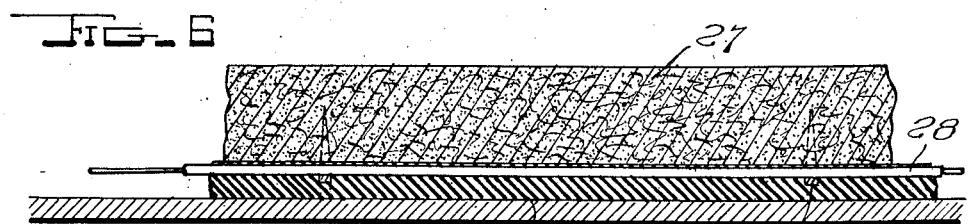
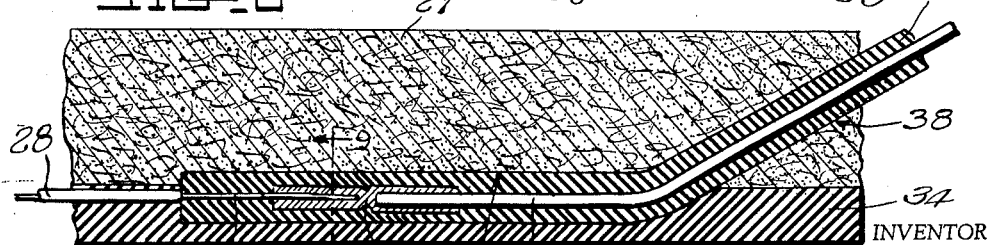
INVENTOR
GEORGE P. DEACON,
BY Linton and Linton
ATTORNEYS United States Patent Office 2,979,595
Patented Apr. 11, 1961

ELECTRICAL RADIANT HEATING SYSTEM

George P. Deacon, Hazlett Court, Wheeling, W. Va.

Filed Mar. 12, 1958, Ser. No. 720,914

1 Claim. (Cl. 219—19)

The present invention relates to electrical heating devices and is more particularly directed to electrical radiant heating devices and systems.

The principal object of the invention is to provide an electrical heating system which can be quickly and economically applied to surfaces, such as for example ceilings, walls or floors of a room and will automatically affix itself to such surfaces becoming a permanent part thereof.

A further and important object of the invention is to provide flat panels of various sizes and heat outputs which can be mounted in existing or new structures alone or in groups to produce the desired amount of radiated heat and which panels can be installed by unskilled workers and without special tools.

A still further object of the invention is to provide radiant heating panels including electrical resistance heating wires which are completely insulated and contained within the panel and have non-heating leads extending from the panels for connection to sources of electrical current as well as in circuits with other like or different panels.

Further objects of the invention will be in part obvious and in part pointed out in the following description of the accompanying drawings in which:

Fig. 1 is a top view of an example of the application of the present heating system above a ceiling.

Fig. 2 is an enlarged interior view of one form of panel according to the invention with the adhering layer removed.

Fig. 3 is an enlarged cross-sectional view of the present heating panel as mounted above one form of ceiling.

Fig. 4 is a further enlarged cross-sectional view of a portion of a heating panel with its detachable protective cover partly removed.

Fig. 5 is a further enlarged cross-sectional view of a portion of a heating panel with the protective cover entirely removed and the panel as mounted upon an attachable supporting surface.

Fig. 6 is a view similar to Fig. 5, but at substantially right angles thereto.

Fig. 7 is a wiring diagram for the present heating system with the post numbers thereon corresponding to the post numbers of Fig. 1.

Fig. 8 is a longitudinal section of an end portion of the heating panel disclosing the lead wire connection; and Fig. 9 is a partial cross-sectional view taken on line 9—9 of Fig. 8.

Referring now more particularly to the accompanying drawings in which reference numerals 1-16 inclusive refer to connector posts or lead wires of a heating system according to the invention.

Fig. 1 schematically discloses, by way of example only, the upper face of a ceiling 21 extending between end walls 22 and side walls 23 which may be a ceiling for an entire room or for a portion of a room. Numeral 24 refers to the conventional joists for supporting the ceiling which extends between the end walls 22. Said joists are spaced apart and maintained substantially parallel to one another and perpendicular to said ceiling by cross braces 25. The construction is substantially conventional in the construction of ceilings which ceilings 21 may be of plaster board. However, the present invention is not limited to the foregoing type of ceiling but may equally as well be applied to other forms thereof.

The invention is directed to heating panels 26 of which a plurality can be mounted on the ceiling between the ceiling joists with a group of such panels shown in Fig. 1.

Each panel 26 comprises a plaster board 27 of a configuration for fitting between said ceiling joists and having an electrical resistance heating wire 28 extending back and forth along the length of one face thereof in the manner best shown in Fig. 2. Said wire 28 is attached to board 27 by a plurality of staples 29.

A layer or coating of a mastic material 34 extends over wires 28 and staple heads 29 substantially covering the plaster board 27 on that face thereof whereby the wires 28 and staples 29 are embedded in this mastic material 34.

A pair of pressure connectors 30 which have a restricted medial portion 31 have the ends 32 of wire 28 each extending within the bore of the connector which is compressed for retaining the same therein.

Non-heating lead wires 33 are each inserted in the bore of the opposite end of one of said connectors 30 which are thereby connected to said lead wires.

Until the heating panel 26 is to be mounted upon the ceiling a sheet 35 having a pressure sensitive adhesive is applied to the outer face 36 of mastic 34. When the panel is to be applied, said sheet 35 is removed.

Said plaster board 27 has a pair of recesses 37 each of which communicates with an angular opening 38 on the side of said plaster board opposite to said mastic. A tubular electrical insulating material 39 covers each of the ends 32 of the heating wires, the connector 30 and the lead wire 33 with this assembly positioned in one of said recesses 37 and extending outwardly from the plaster board 27 through one of the openings 38 in the manner shown in Fig. 8. A similar arrangement is provided for each of the lead wires, their connectors and the attached end of a heating wire. Preferably each said arrangement is at the corresponding end of a heating panel whereby they can be positioned in the manner shown in Fig. 1 with a lead wire 33 connected to a post 1, a second lead wire 33 connected to a post 2, etc. The connector posts can be mounted upon the plaster boards 27 with said lead wires connected thereto if desired.

As diagrammatically shown in Fig. 7, the lead wires 33 from one side of all of the heating panels on a ceiling, are connected to their respective posts 1, 3, 5, 7, 9, 11, 13, and 15; and for example, by wires 1a, 3a, 5a, 7a, 9a, 11a, 13a and 15a respectively to connector posts 40 upon a connecting panel 41 for being connected to posts 42 each of which are connected by wires 43 to one pole of a conventional thermostat 44 such as a bimetallic operated circuit maker and breaker which thermostat may be located in the area below said ceiling for being operated at given temperatures within said area. Said thermostat is connected by wires 45 to the building or house circuit for the supply of electrical current thereto. Wires 46 are connected to the other pole of said thermostat and at their opposite end to posts 47 of a connection panel 48 for being connected to posts 49. Said posts 49 are joined by wires 2a, 4a, 6a, 8a, 10a, 12a, 14a, and 16a to the second side of each of said heating panels, namely posts 2, 4, 6, 8, 10, 12, 14 and 16 respectively whereby the heating elements 28 of each panel are connected in parallel.

As a more specific example of a panel board according to the present invention, the plaster board 27 may be a rectangular elongated gypsum rock board with thermoplastic nylon jacketed Nichrome resistance wire 28 laid thereon and extending back and forth of said board while spaced apart in substantially parallel lines and having the ends 32 of said wire positioned at one end of the board. The wire is further positioned from the ends of the plaster board. A suitable wire for example should have a resistance as to produce 2.55 watts per foot of wire and the wattage for the entire board can be governed by the amount of wire placed thereon. Wire 28 is then retained on said board 27 by zinc-coated staples having the wire passing therethrough with the staples embedded in said plaster board.

Further, plaster board 27 as shown in Figures 8 and 9 has a pair of recesses 37 in one end thereof in each of which is positioned a pressure contact splice 30 with an end 32 of said wire joined therein at one end and the non-heating copper wire for the lead wire 33 connected to the opposite end of said splice and the entire splice covered with a thermoplastic insulation 39. The non-heating lead wire is then lead through the opening 38 emerging a short distance from recess 37 near the end of the board as shown in Fig. 8.

Board 27, wires 28, staples 29, connectors 30 are then covered with a gypsum resin adhesive mastic so as to completely cover said heating wires and the splice.

Said specific example of the present heating panel is given by way of example only, as other forms of wires, staples and mastics can be likewise employed.

In the use of the present heating panels 26, each of the same is inserted between the joists 24 and under the cross braces 25 above a ceiling 21 after the sheet 35 has been removed with the mastic 34 positioned against the sealing 21. Upon adjustment of the thermostat 34 to a given temperature below that in the space beneath ceiling 21, said thermostat will close and conduct current from wires 45 through wires 43 and 46 connecting panels 41 and 48 to the wires 1a to 16a inclusive and thus through the connectors 30 to the heating wires 28. Said wires 28 will heat the mastic rendering the same adhesive to the ceiling 21 and through chemical and air drying when the current is disconnected from said heating wires cooling said mastic firmly and permanently bonding the panel to the ceiling. Thereafter passing current through said resistance wires will no longer effect the mastic but heat will be passed therefrom to ceiling 21 and conducted thereby to the space below for raising the temperature therein above the setting of a thermostat whereupon said thermostat will make and break the connection with wires 45 for maintaining the space below ceiling 21 at the given temperature.

As many heating panels 26 are placed above ceiling 21 as are found necessary to properly heat the space below said ceiling which will vary with conditions in said space and can be determined from experience.

The present invention is capable of considerable modification and such changes thereto as come within the scope of the appended claim are deemed to be parts of the invention.

What I claim is:

An electrical heating panel comprising a flat sheet of plaster board, an electrical resistance heating wire extending along and connected to one face of said sheet, said sheet having a pair of recesses in said face thereof and a pair of slanting openings each placing one of said recesses in communication with the other face of said sheet, a pair of wire connectors each positioned in one of said sheet recesses and connected to an end of said heating wire, a pair of non-heating leads for connection to a source of electrical current each extending through one of said sheet slanting openings from said sheets other face to one of said recesses being connected to the wire connector therein and a covering of a heat transferring material over said wire, connectors and the first mentioned face of said sheet adhering to said sheets first mentioned face.

References Cited in the file of this patent

UNITED STATES PATENTS

| | | |
|---|---|---|
| 2,084,468 | Wach | June 22, 1937 |
| 2,138,217 | Sutter | Nov. 29, 1938 |
| 2,503,601 | Tice | Apr. 11, 1950 |
| 2,504,146 | Mossin | Apr. 18, 1950 |
| 2,512,875 | Reynolds | June 27, 1950 |
| 2,518,807 | Musgrave et al. | Aug. 15, 1950 |
| 2,521,540 | Richardson | Sept. 5, 1950 |
| 2,540,465 | Tice | Feb. 6, 1951 |
| 2,613,306 | Waltersdorf et al. | Oct. 7, 1952 |
| 2,615,115 | Watter | Oct. 21, 1952 |
| 2,762,896 | Pendleton | Sept. 11, 1956 |
| 2,804,533 | Nathanson | Aug. 27, 1957 |
| 2,844,696 | Custer | July 22, 1958 |